United States Patent [19]
Fang et al.

[11] Patent Number: 5,946,708
[45] Date of Patent: Aug. 31, 1999

[54] AUTOMATED CACHE MANAGER FOR STORAGE DEVICES

[75] Inventors: Cheng-Chi Fang, Union City; Chao-I Chang, Sunnyvale, both of Calif.

[73] Assignee: Integrated Memory Logic, Inc, Santa Clara, Calif.

[21] Appl. No.: 08/788,312

[22] Filed: Jan. 24, 1997

[51] Int. Cl.[6] .................................................. G06F 13/12
[52] U.S. Cl. ............................................. 711/113; 710/22
[58] Field of Search .................................. 711/113, 118; 395/842, 846; 710/22, 26

[56] References Cited

U.S. PATENT DOCUMENTS

| | | | |
|---|---|---|---|
| 4,723,223 | 2/1988 | Hanada | 395/846 |
| 5,333,290 | 7/1994 | Kato | 395/846 |
| 5,581,715 | 12/1996 | Verinsky et al. | 395/309 |
| 5,623,700 | 4/1997 | Parks et al. | 395/873 |

Primary Examiner—Eddie P. Chan
Assistant Examiner—Kevin L. Ellis
Attorney, Agent, or Firm—Skjerven, Morrill, MacPherson, Franklin & Friel, LLP; Alan H. MacPherson; Gary J. Edwards

[57] ABSTRACT

An embodiment of an automated cache manager includes a word/block converter, which generates a word count from a valid cache block register, a current block register, and a total block transfer register. For example, the word/block converter obtains the number of valid cache blocks and calculates a partial transfer length based on the number of valid cache blocks, the total block transfer length, and the maximum partial transfer length. The automated cache manager then initiates a partial transfer with the calculated partial transfer length.

57 Claims, 9 Drawing Sheets

Microfiche Appendix Included
(1 Microfiche, 20 Pages)

AUTOMATED CACHE MANAGER FOR STORAGE DEVICES

CROSS REFERENCE TO MICROFICHE APPENDIX

Appendix A, which is a part of the present disclosure, is a microfiche appendix consisting of 1 sheet of microfiche having a total of 20 frames. Microfiche Appendix A is a listing of Verilog code for embodiments of components of this invention, which are described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to cache managers and in particular to a cache manager for storage devices such as CD-ROM drives, DVD drives, and hard drives.

2. Description of the Related Art

Advances in semiconductor manufacturing and microprocessor design have combined to create microprocessors with enormous processing power running at very high frequencies. However, the benefits of fast microprocessors are lost in a computer system if the computer system is unable to retrieve data at a very high rate for the microprocessor. Many techniques to improve the rate of data transfer between the microprocessor and main memory have been developed. However, the data transfer rate from storage devices, such as CD-ROM drives, DVD drives, hard drives, and tape drives, to main memory or directly to the microprocessor still presents a bottleneck to the overall performance of a computer system.

Many computer applications process large quantities of data. For example, a multimedia application may process both video and audio data. To produce high resolution graphics and high quality sound a vast amount of audio data and video data must be available for the multimedia application. The data is typically stored on CD-ROM since CD-ROMs are inexpensive to manufacture and hold a large quantity of data. However, other storage devices such as magnetic fixed disks and magneto-optical disks are also used. Since the data must be retrieved from the storage device for the application program, the data transfer rate between the storage device and the processor may dictate the speed of the entire computer system. Therefore, the storage device should be able to transfer data to the computer system very rapidly.

FIG. 1 shows a block diagram of a typical storage device 100 coupled to a host computer system 190 through a peripheral bus 160. A storage media 110, for example a CD-ROM, a DVD, a magnetic disk, or a magnetic tape, is driven by a motor 114 under the control of a motor/servo controller 118. Data on storage media 110 are stored in storage media data blocks. The specific format of a storage media data block is standardized for different devices. FIG. 3(b) illustrates a storage media block of a CD-ROM and FIG. 3(c) illustrates a storage media block for a DVD disk. A signal detector/writer 122 (FIG. 1), for example an optical head or a magnetic head, reads and writes data from storage media 110. Feedback signals read by or generated by signal detector/writer 122 may be sent to motor/servo controller 118 for synchronization.

On read transfers, the signal read by signal detector/writer 122 is amplified by an amplifier 126. In some embodiments of storage device 100, synchronization data are amplified before the synchronization data is sent to motor/servo controller 118. The amplified signal is then sent to a digital signal processor (DSP) 130, which may also provide control signals to motor/servo controller 118. DSP 130 processes the amplified data for use by host computer system 190. Some embodiments of storage device 100 include a digital to analog converter 135 to provide data from storage media 110 to analog devices. For example, a CD-ROM drive typically provides audio data in analog form. The processed data is sent to a device controller 140. In some storage devices a secondary data channel may also be stored on storage media 110. For example, a CD-ROM contains a secondary data channel called the subcode data channel. On write transfers, DSP 130 generates a data signal for signal detector/writer 122 based on the data received from host computer system 190.

Device controller 140 typically uses a memory buffer 150 as a cache for the processed data or the incoming data. Device controller 140 also provides the interface for storage device 100 to peripheral bus 160. Peripheral bus 160 could be, for example, an IDE bus using ATAPI protocols, a SCSI bus or an IEEE 1394-1995 bus. Since peripheral bus 160 communicates with many different types of storage devices, transfers on peripheral bus 160 are typically based on the number of data words to transfer rather than the number of storage media blocks. Peripheral bus 160 couples storage device 100 to host computer system 190. Storage Device 100 also contains a microcontroller 170, which could be a microprocessor, to control the other components of storage device 100.

Microcontroller 170 may use a portion of memory buffer 150 for system information. Microcontroller 170 executes firmware instructions, i.e. computer code stored in microcontroller 170, a ROM (not shown) or a flash memory device (not shown), to interface with host computer system 190 in conjunction with device controller 140 through peripheral bus 160. To reduce the cost of storage device 100, microcontroller 170 is typically a much less powerful device than the microprocessor of host computer system 190. Therefore, microcontroller 170 executes instructions much slower than the microprocessor of host computer system 190.

In a typical read transaction host computer system 190 sends a request for data through peripheral bus 160. Microcontroller 170 with device controller 140 interprets the request and retrieves the requested data from storage media 110 into memory buffer 150. When memory buffer 150 contains a sufficient amount of data, device controller 140 and microcontroller 170 sends the stored data from memory buffer 150 to host computer system 190 through peripheral bus 160. The specific amount of data stored in memory buffer 150 before transfer to host computer system 190 depends on the specific type of storage device and the specific request made by host computer system 190.

In a typical write transaction, host computer system 190 sends a write request through peripheral bus 160. Microcontroller 170 with device controller 140 interprets the request and receives the incoming data from host computer system 190 into memory buffer 150. When memory buffer 150 contains a sufficient amount of data, device controller 140 and microcontroller 170 sends the stored data from memory buffer 150 to storage media 110.

Interfacing with peripheral bus 160 is typically very complex. Therefore, the task of interfacing with peripheral bus 160 is divided between microcontroller 170 and device controller 140. In conventional storage devices, microcontroller 170 handles the bulk of the control portion of the interface and device controller 140 primarily handles the data transfer. However, since microcontroller 170 is a slow device, substantial delays are introduced by over reliance on microcontroller 170. Hence, there is a need for a method or apparatus to interface efficiently with peripheral bus 160 without the need for excessive assistance of microcontroller 170.

SUMMARY OF THE INVENTION

In accordance with this invention, an automated cache manager in a device controller of a storage device automates transfers between the cache of the storage device and a host computer system without unduly relying on the microcontroller of the storage device.

One embodiment of the automated cache manager includes a word/block converter, which generates a word count from a valid cache block register. The automated cache manager also includes a current block register for use during a partial transfer and a total block transfer register to count the number of blocks to be transferred. One embodiment of the word/block converter obtains the number of valid cache blocks and calculates a partial transfer length based on the number of valid cache blocks, the total block transfer length, and the maximum partial transfer length. The automated cache manager then initiates a partial transfer with the calculated partial transfer length.

A second embodiment of the invention includes a first segment length register and a second segment length register so that multiple segments of data within a single block of data can be transferred. The first segment length register and second segment length register are coupled to an adder which generates a data length for the data block. The data length is provided to the word/block converter to determine the total number of words to be transferred in a partial transfer.

Another embodiment of the word/block converter includes a first comparator coupled to the current block register and the total block register. The first comparator is coupled to a multiplier, which receives the data length of a block. A second comparator receives the product from the multiplier and the maximum partial transfer length. Thus one embodiment of the word/block converter calculates a word count by comparing the number of valid cache blocks with the total transfer length to determine a first lower value; multiplying the first lower value with the data length; and comparing the product with the maximum partial transfer length.

DETAILED DESCRIPTION

According to the principles of this invention, certain limitations imposed by conventional storage devices have been overcome. The present invention provides an interface for peripheral bus 160 without excessive assistance from microcontroller 170. For example, in one embodiment of the invention, a device controller for an IDE/ATAPI CD-ROM drive provides automated ATAPI packet command receiving, automated DRQ packet handler, and automated protocol control on block transfers for ATAPI read/write commands.

Figure 1:
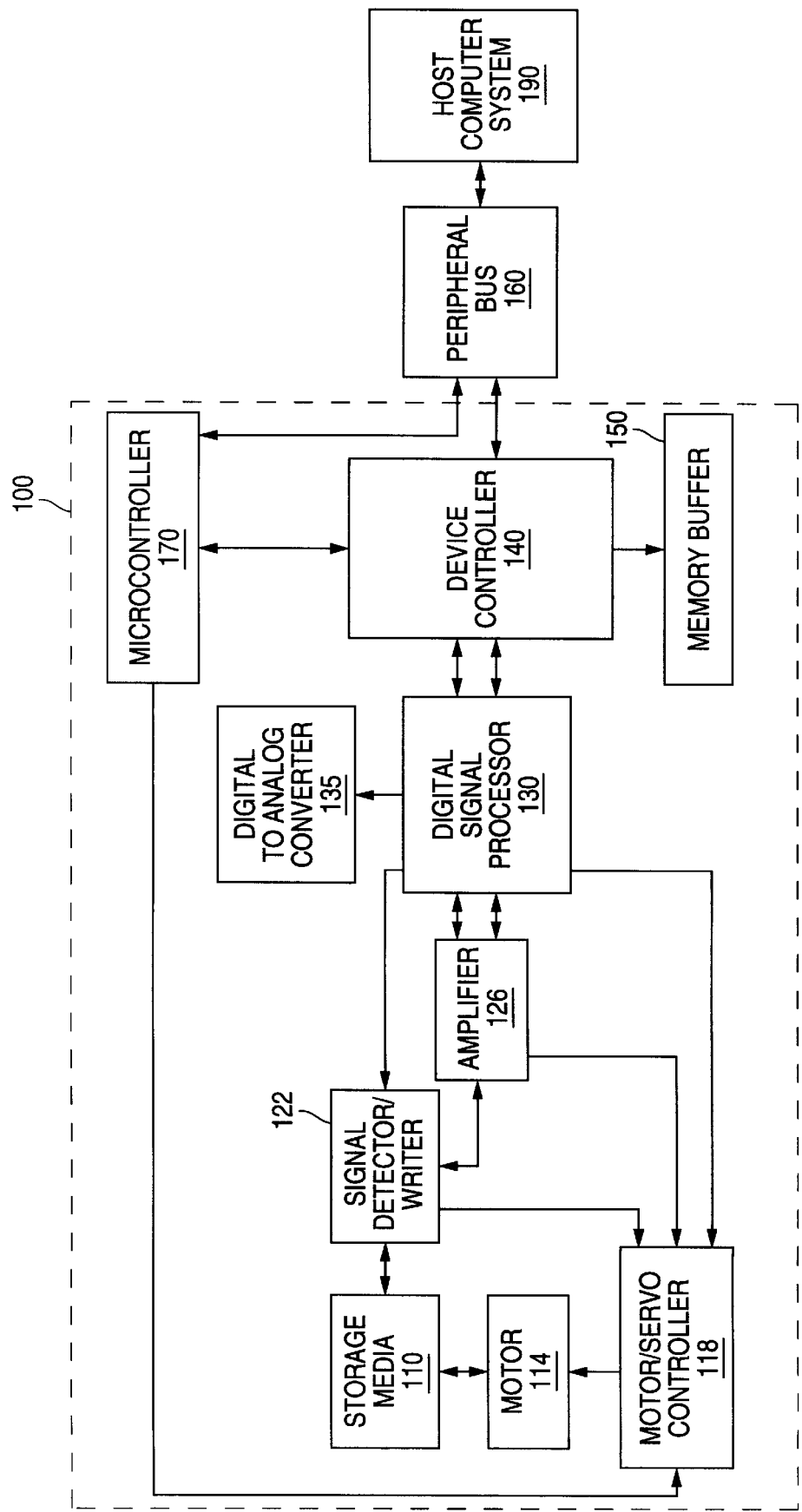
FIG. 1 shows a storage device coupled to a host computer system through a peripheral bus.
Figure 2A:
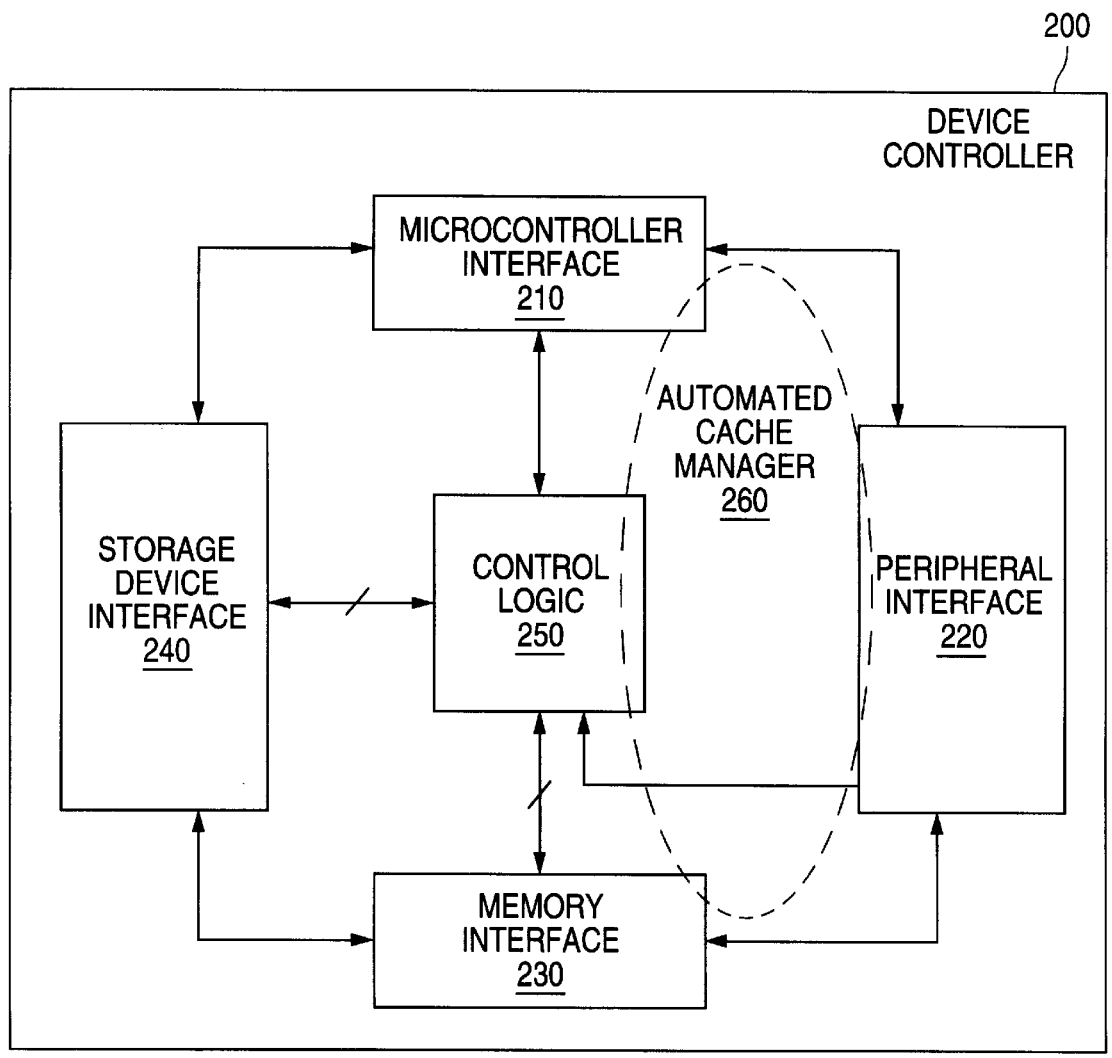
FIG. 2(a) shows a device controller containing an automated cache manager in accordance with one embodiment of the present invention.

FIG. 2(a) shows a conceptual block diagram of a device controller 200, which can be used in place of device controller 140 (FIG. 1.) with appropriate changes in the firmware used by microcontroller 170. Device controller 200 includes a microcontroller interface 210, a peripheral bus interface 220, a memory interface 230, a storage device interface 240, and control logic 250. Automated cache manager 260 encompasses parts of peripheral interface 220, memory interface 230, microcontroller interface 210, and control logic 250. Microcontroller interface 210 is coupled to microcontroller 170 to exchange data and control signals between device controller 200 and microcontroller 170. Storage device interface 240 interacts with the components of storage device 100 (FIG. 1) to receive data from storage media 110. Typically, storage device interface 240 passes the incoming data to memory interface 230 for caching in memory buffer 150. Some embodiments of device controller 200 include error detecting and correcting circuits to correct any errors in the data from storage media 110. Some embodiments of device controller 200 perform error detection on all of the data and then only perform error correction on erroneous data. The cached data is eventually sent to host computer system 190 through peripheral interface 220 and peripheral bus 160. Similarly, some embodiments of device controller 200 include circuits to generate error correcting code for data to be stored on storage media 110 during write operations. Control logic 250 controls and connects the various interfaces of device controller 200.

Figure 2B:
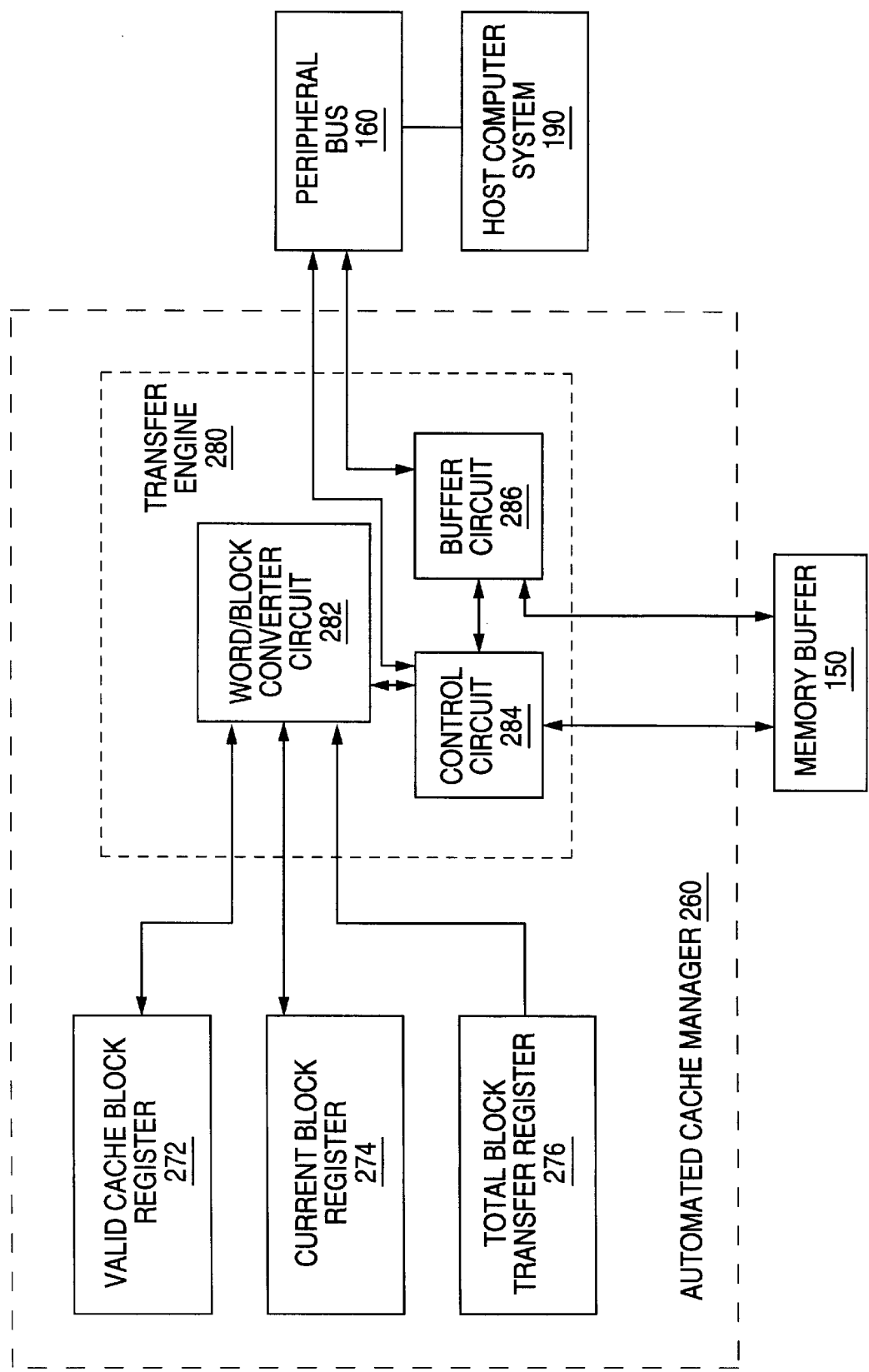
FIG. 2(b) shows a block diagram of an automated cache manager in accordance with one embodiment of the present invention.

FIG. 2(b) shows a block diagram of automated cache manager 260 coupled to peripheral bus 160 and memory buffer 150. Automated cache manager 260 includes a valid cache block register 272 containing the valid cache block count, a current block register 274 containing the current block count, a total block transfer register 276 containing the total block transfer count, and a transfer engine 280, which transfers data between memory buffer 150 and peripheral bus 160.

On a host read transfer, i.e., a transfer of data from storage media 110 to host computer system 190, the total block transfer count indicates the number of storage media data blocks remaining in the host read transfer. The valid cache block count indicates the number of valid storage media data blocks in memory buffer 150. The current block count is a temporary value to indicate the number of valid storage media data blocks in memory buffer 150 for a partial transfer. Typically, automated cache manager 260 completes the host transfers in one or more partial transfers.

For a host write transfer, i.e. a transfer of data from host computer system 190 to storage media 110, the total block transfer count indicates the number of storage media data blocks remaining in the host write transfer. The valid cache block count indicates the number of storage media data blocks that memory buffer 150 can receive, i.e. the number of empty storage media data blocks in memory buffer 150. The current block count is a temporary value to indicate the number of empty storage media data blocks in memory buffer 150 for a partial transfer.

Figure 6:
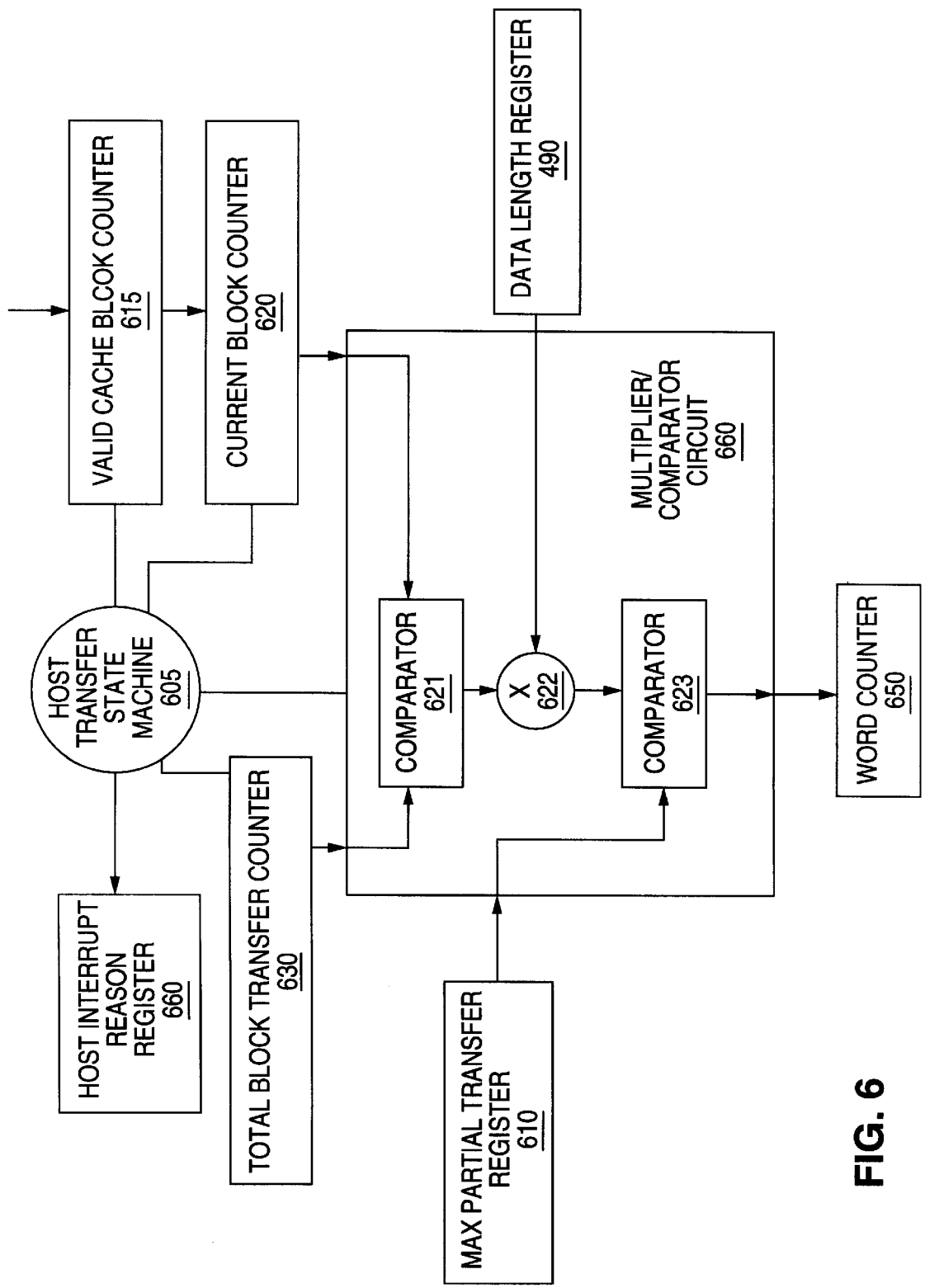
FIG. 6 shows a control circuit used in a cache manager in accordance with one embodiment of the present invention.

Transfer engine 280 typically includes a buffer circuit 286 to couple memory buffer 150 to peripheral bus 160. A control circuit 284 controls buffer circuit 286, peripheral bus 160, and memory buffer 150. Transfer engine 280 uses a word/block converter circuit 282 to convert the storage media block based transfers from storage media 110 to a word based transfer as typically required by peripheral bus 160. One embodiment of word/block converter circuit 282 as shown in FIG. 4 and FIG. 6 includes a multiplier/comparator circuit 660 and an adder 480.

Figure 3A:
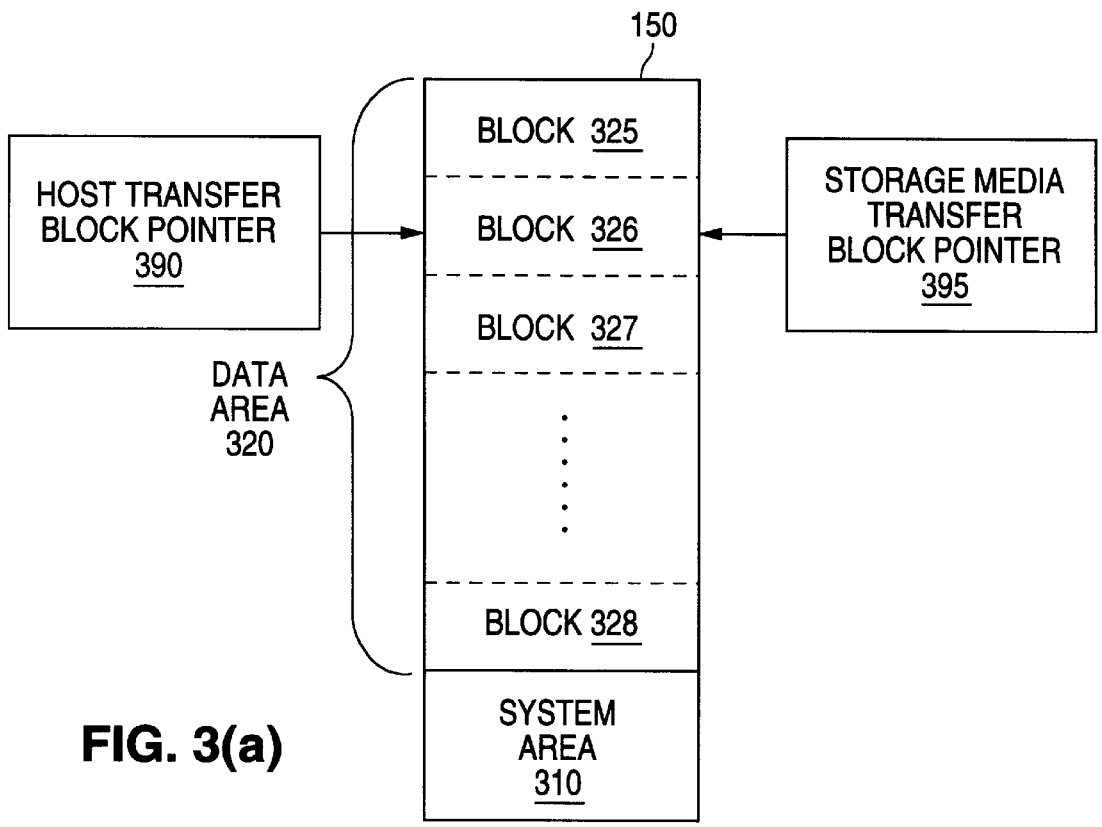
FIG. 3(a) shows the memory format of a memory buffer used by a cache manager in accordance with one embodiment of the present invention.
Figure 3B:
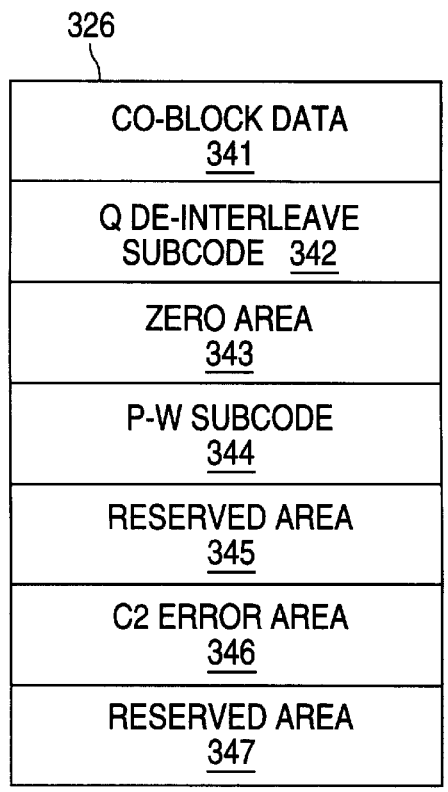
FIG. 3(b) shows the data block format of a CD-ROM.
Figure 3C:
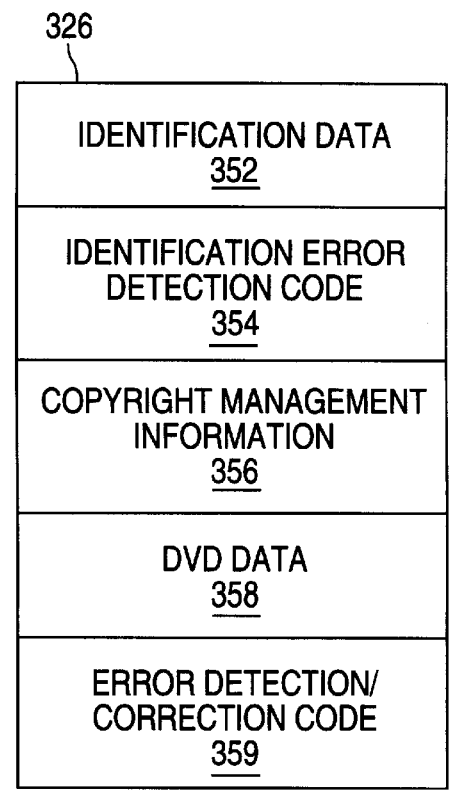
FIG. 3(c) shows the data block format of a DVD.

FIG. 3(a) illustrates the contents of memory buffer 150 as used by one embodiment of automated cache manager 260. Memory buffer 150 is partitioned into a system area 310 and a data area 320. Data from storage media 110 are stored in data area 320. Unlike conventional systems, most embodiments of device controller 200 store entire blocks of data 325–328 from storage media 110, i.e. storage media blocks, sequentially in data area 320. Furthermore, some embodiments also store error information with each storage media block. FIG. 3(b) shows the details of block of data 326 if storage media 110 is a CD-ROM. For a CD-Rom, block of data 326 includes CD block data 341 (2,352 bytes), Q de-interleave subcode 342 (twelve bytes), zero area 343 (four bytes), P-W Subcode 344 (96 bytes), reserved area 345 (96 bytes), optional C2 error area 346 (296 bytes), and optional reserved area 347 (216 bytes). Thus, if storage media 110 is a CD-ROM each block of data in data area 320 is either 2.5 kilobytes or 3.0 kilobytes in length. In contrast, conventional CD-ROM drive controllers store the CD block data of different CD-ROM blocks contiguously in one data area and P-W subcode data of different CD-ROM blocks contiguously in another data area of the cache. FIG. 3(c) shows details of block of data 326 if storage media 110 is a DVD disk. For a DVD, block of data 326 would include identification data 352 (4 bytes), identification error detection code 354 (2 bytes), copyright management information 356 (6 bytes), DVD data 358 (2048 bytes), and error detection code 359 (4 bytes).

Typically, memory buffer 150 (FIG. 3(a)) is used as a dual-port FIFO, i.e. data is read out of memory buffer 150 in the same order as the data was stored. A host transfer block pointer 390 is used to calculate the address of the appropriate block of data being sent to or received from host computer system 190. A storage media transfer block pointer 395 is used to calculate the address of the appropriate block of data being sent to or received from storage media 110. For a host read, host transfer block pointer 390 is the read pointer for memory buffer 150 and storage media transfer block pointer 395 is the write pointer. Conversely, for a host write, host transfer block pointer 390 is the write pointer and storage media transfer block pointer 395 is the read pointer. Both host transfer block pointer 390 and storage media transfer block pointer 395 can be register/counters. In one embodiment host transfer block pointer 390 and storage media transfer block pointer point to storage media blocks in memory buffer 150 rather than actual memory addresses.

Figure 4:
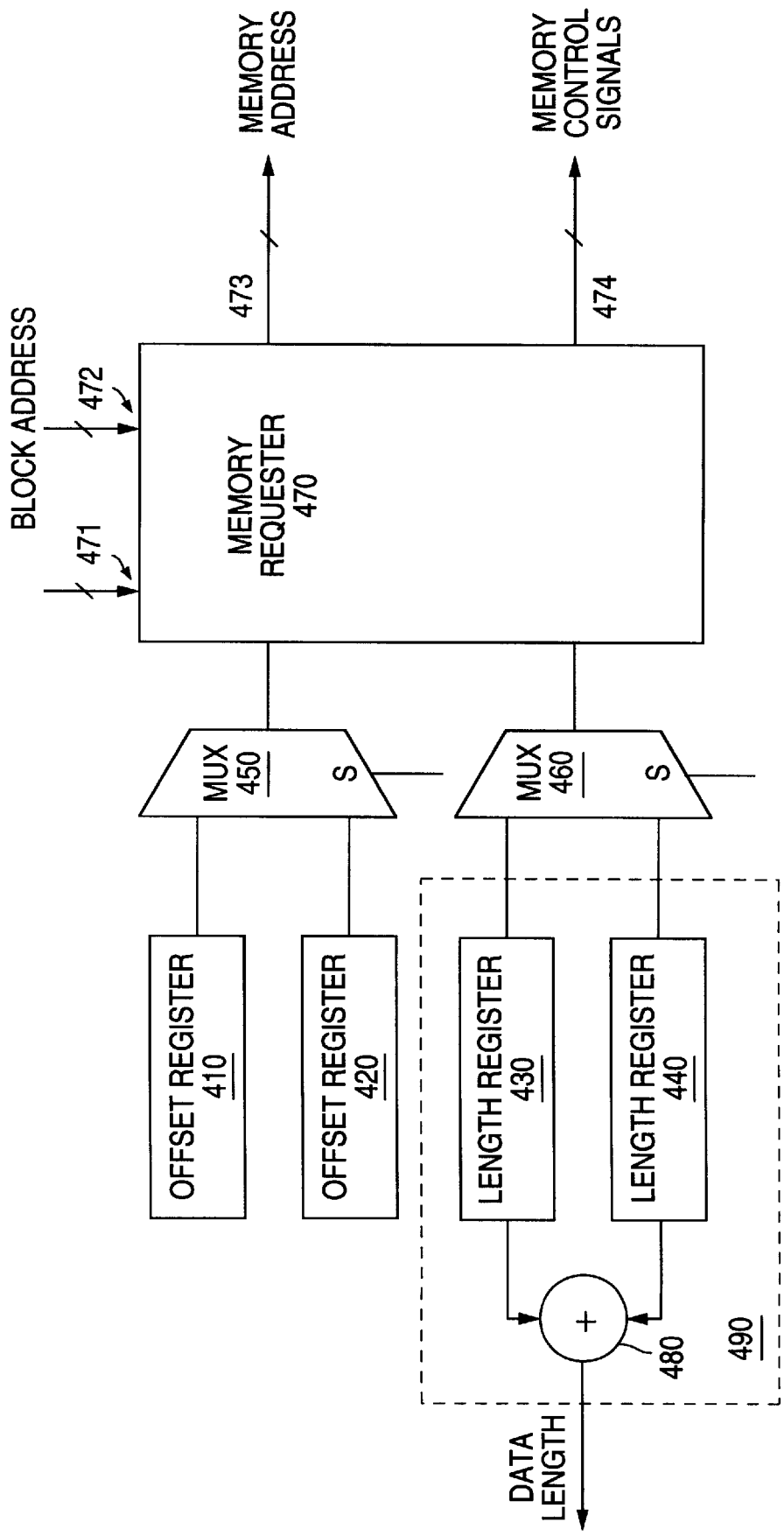
FIG. 4 shows a memory addressing circuit used in a cache manager in accordance with one embodiment of the present invention.

For embodiments of automated cache manager 260 using the storage scheme of FIG. 3(a), the circuit diagramed in FIG. 4, which is part of control circuit 284, can be used to retrieve specific segments of data from within a block of data stored in memory buffer 150. A first offset register 410 stores the location within a block of a first segment of data. A second offset register 420 stores the location within a block of a second segment of data. The offset values are multiplexed through multiplexor 450 to memory requester 470. The length of the first segment is stored in a first data length register 430. The length of the second data segment is stored in a second length register 440. First data length register 430 and second data length register 440 may be included in data length register 490. The lengths values are multiplexed through multiplexor 460 to memory requester 470. The select lines S of multiplexor 450 and multiplexor 460 are controlled by a memory transfer state machine 530 (FIG. 5) as described below. Additional length registers and offset register can be added if more than two segments of a block of data is needed.

During a single host data transfer, the desired segments are the same within every block of data in memory buffer 150. Microcontroller 170 decodes a host transfer request to determine and set the values in first data length register 430, second data length register 440, first offset register 410, and second offset register 420. For example, if storage device 100 is a CD-ROM drive and the desired data consists of CD block data 341 (FIG. 3(b)) and P-W subcode 344 (FIG. 3(b)), the registers of FIG. 4 would be programmed as follows:

First Offset Register 410=0
Second Offset Register 420=2368
First Data Length Register 430=2352
Second Data Length Register 440=96

First data length register 430 and second data length register 440 are also coupled to an adder 480. Adder 480 adds the segment lengths to generate a data length representing the total number of requested words in one data block. The data length is used by multiplier/comparator circuit 660 (FIG. 6). If only one segment of a block of data is ever needed, a single data length register 490 can be coupled directly to multiplier/comparator circuit 660.

In addition to segment length and segment offset, Memory requester 470 receives data block address signals 472 from host transfer block pointer 390 or storage media transfer block pointer 395 (FIG. 3) and control signals 471 from both microcontroller 170 (FIG. 1) and memory transfer state machine 530 (FIG. 5) to generate memory address signals 473 and memory control signals 474 to control memory buffer 150. The specific circuitry for memory requester 470 depends on the type of memory used for memory buffer 150. Typically, various types of DRAM, such as fast page mode, EDO, synchronous, or RAMBUS, is used for memory buffer 150; other types of memory such as static RAM can also be used. To maximize transfer speed, memory buffer 150 can be a dedicated SRAM cache. However, to save costs memory buffer 150 is often used for multiple purposes and composed of DRAM. A memory arbitration scheme is necessary for embodiments of storage device 100 using memory buffer 150 for multiple purposes. One skilled in the art can apply the principles described herein to design memory requester 470 to access memory buffer 150 as required by automated cache manager 260. Furthermore, a specific embodiment of memory requestor 470 is provided in the microfiche appendix, which contains verilog code for an automated cache manager for an ATAPI CD-ROM drive controller in accordance with one embodiment of the invention.

Figure 5:
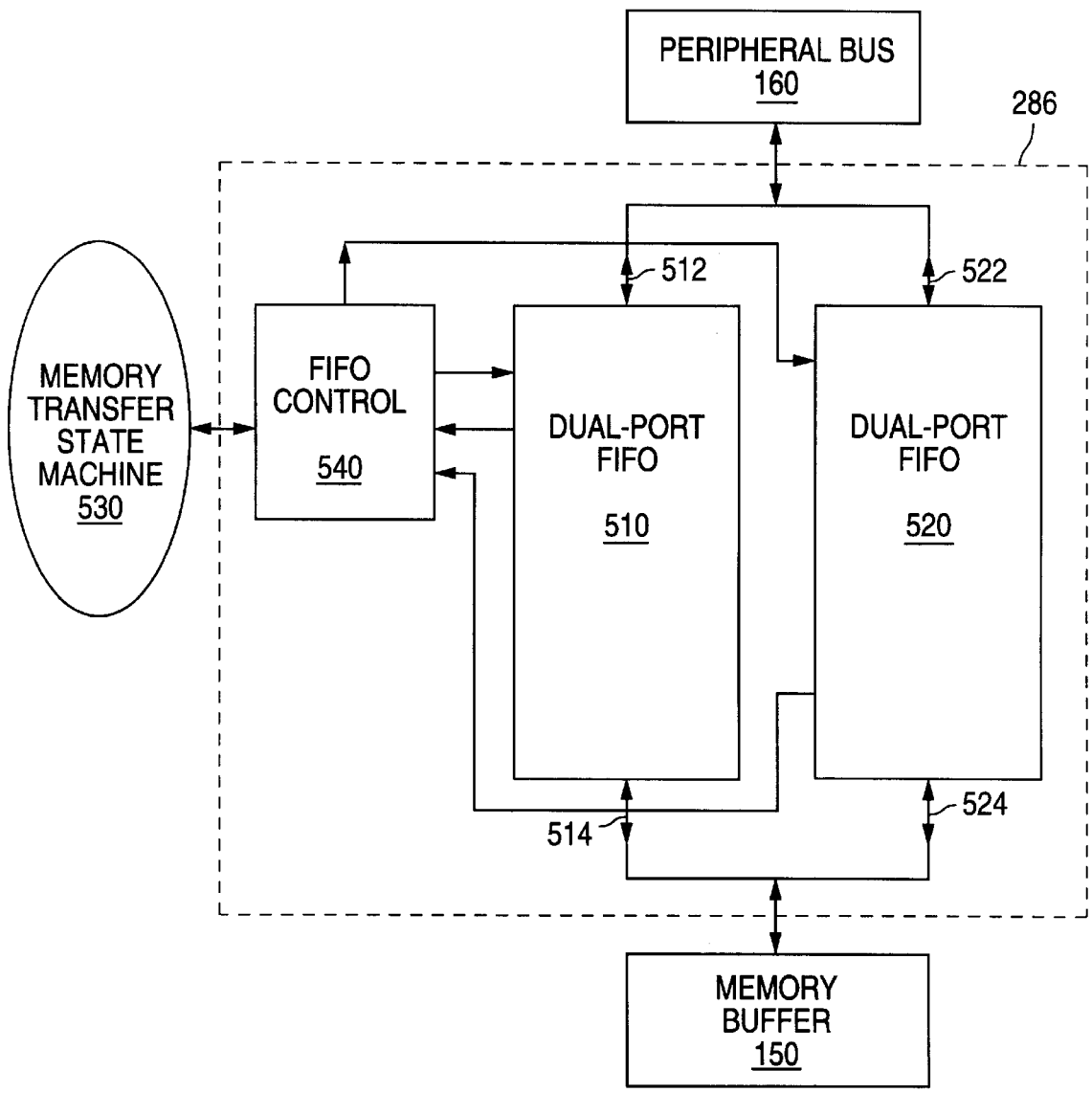
FIG. 5 shows a double buffering circuit used by a cache manager in accordance with one embodiment of the present invention.

FIG. 5 illustrates one embodiment of buffer circuit 286. The embodiment of FIG. 5 is a dual-port FIFO memory structure using double buffering. Specifically, FIG. 5 contains a first dual-port FIFO 510 and a second dual-port FIFO 520. Both dual-port FIFO 510 and dual-port FIFO 520 are coupled to peripheral bus 160 and memory buffer 150. During a data transfer between memory buffer 150 and peripheral bus 160, a memory transfer state machine 530 commands FIFO controller 540 and memory requestor 470 to utilize both dual-port FIFO 510 and dual-port FIFO 520 as described below. FIFO controller 540 generates the read and write pointers for dual-port FIFO 510 and dual-port FIFO 520. FIFO status signals provide status information, such as FIFO full, FIFO empty, and FIFO half-full, for dual-port FIFO 510 and dual-port FIFO 520 to memory transfer state machine 530. Dual-port FIFO 520 and dual-port FIFO 530 are used in well known double buffering schemes so that while one of the dual-port FIFO is being filled, the other is being emptied until the transfer of data is complete.

For read/write storage devices such as disk drives, DVD drives, or CD-Rewritable drives, dual-port FIFO 510 and dual-port FIFO 520 are bidirectional FIFOs. For read only storage devices such as a CD-ROM drive, dual-port FIFO 510 and dual-port FIFO 520 can be unidirectional. However, since some embodiments of the invention use the dual-port FIFOs to store multiple byte commands from peripheral bus 160; these embodiments of the invention use bidirectional FIFOs even with read only storage devices.

FIG. 6 illustrates a portion of one embodiment of control circuit 284 for one embodiment of automated cache manager 260. Furthermore, the embodiment of FIG. 6 uses counters for valid cache block register 272, current block register 275, and total block transfer register 276. The transfer protocols during a host data transfer command begins with host computer system 190 issuing a host read transfer command or a host write transfer command through peripheral bus 160, which can be an IDE/ATAPI bus. Specifically, host computer system 190 programs the maximum partial transfer length, i.e. the maximum length allowed for a single partial transfer, e.g. in an ATAPI device the maximum partial transfer length is programmed in an ATAPI byte count low register and a ATAPI byte count high register. Host computer system 190 then programs a command register to initiate a packet command, for example A0h for a packet command on an ATAPI device.

Automated cache manager 260 automatically copies the maximum partial transfer length, e.g. from the ATAPI byte count low and ATAPI byte count high register for an ATAPI device, into a MAX partial transfer register 610 without the intervention of microcontroller 170 after host computer system 190 initiates the packet command. Device controller 200 then sends an interrupt to host computer system 190 to indicate that device controller 200 is ready to receive a command packet. Host computer system 190 writes a command packet to a command packet FIFO register. For example, an ATAPI command packet is 12 bytes or 16 bytes in length and would be written to the ATAPI packet FIFO register. Device controller 200 automatically transfer the bytes of the ATAPI command packet into dual-port FIFO 510 without the intervention of microcontroller 170. The command packet controls the host data transfer by dictating parameters such as the total block length, storage media start address, and the type of data to transfer.

For host read transfers, microcontroller 170 reads and interprets the command packet in dual-port FIFO 510 to cause the requested data from storage media 110 to be transferred to device controller 200 and memory buffer 150. Microcontroller 170 also programs total block transfer counter 630 (FIG. 6), first data length register 430 (FIG. 4), second data length register 440, first offset register 410, and second offset register 420 based on the contents of the command packet. Furthermore, microcontroller 170 programs host transfer block pointer 390 (FIG. 3) to point to the first valid block of memory buffer 150 and programs a valid cache block counter 615 with the number of valid blocks in memory buffer 150. Microcontroller 170 then issues a start command to a host transfer state machine 605 to transfer the requested data to host computer system 190.

For host write transfers, microcontroller 170 reads and interprets the command packet in dual-port FIFO 510. Microcontroller 170 programs total block transfer counter 630 (FIG. 6), first data length register 430 (FIG. 4), second data length register 440, first offset register 410, and second offset register 420 based on the contents of the command packet. Furthermore, microcontroller 170 programs host transfer block pointer 390 (FIG. 3) to point to the first empty block of memory buffer 150 and programs a valid cache block counter 615 with the number of empty blocks in memory buffer 150. Microcontroller 170 then issues a start command to a host transfer state machine 605 to transfer the incoming data from host computer system 190 to memory buffer 150. Microcontroller 170 also controls the transfer of the stored data from memory buffer 150 to storage media 110.

Automated cache manager 260 then automatically completes the portion of the data transfer between host computer system 190 and memory buffer 150 with only minimal assistance (as described in detail below) from microcontroller 170. Some embodiments of automated cache manager 260 can optionally function in "non-automode." In non-automode, host transfer state machine 605 and memory transfer state machine 530 are partially disabled.

Automated cache manager 260 completes the host data transfers in one or more partial transfers, e.g. DRQ transfers for ATAPI devices. The length of each partial transfer is determined by the number of valid blocks in memory buffer 150 for reads or the number of empty blocks in memory buffer 150 for writes. However, the length of each partial transfer must be less than or equal to the maximum partial transfer length as specified by host computer system 190.

Specifically, host transfer state machine 605 controls the circuitry of FIG. 6 to transfer data between memory buffer 150 and host computer system 190. At the beginning of a transfer, total block transfer counter 630 contains the total block transfer count, i.e. the total number of storage media blocks to be transferred. Valid cache block counters 615 contains the valid cache block count. For host read transfers, the valid cache block count is the number of storage media blocks available in memory buffer 150. For host write transfers, the valid cache block count is the number of empty storage media blocks available in memory buffer 150. The valid cache block count in valid cache block counter 615 is copied as the current block count to current block counter 620.

Multiplier/comparator 660 compares the total block transfer count in total block transfer counter 630 with the current block count in current block counter 620 using comparator 621 to determine the lower of the two values. The lower value is multiplied with the data length from data length register 490 in multiplier 622.

The product from multiplier 622, which represents the total number of valid words for the host read transfer available in memory buffer 150 or the total number of empty words for the host write transfer available in memory buffer 150, is compared with the maximum partial transfer length stored in MAX partial transfer register 610 by comparator 623. Since, the maximum partial transfer length is supplied by host computer system 190 to indicate the maximum length allowed for a single partial transfer, the lower value is stored in word counter 650 to represent the number of data words to be transferred in the next partial transfer with host computer system 190. Word counter 650 decrements by one for each word transferred between memory buffer 150 and host computer system 190. In some embodiments of multiplier/comparator circuit 660, a single comparator is used twice rather than having two separate comparators.

The word count in word counter 650 is also written to one or more host registers in device controller 200 so that host computer system 190 can read the value to determine the number of words of data to be transferred in the next partial transfer. For ATAPI devices, the word count in word counter 650 is written in the ATAPI byte count low register and ATAPI byte count high register.

Figure 7:
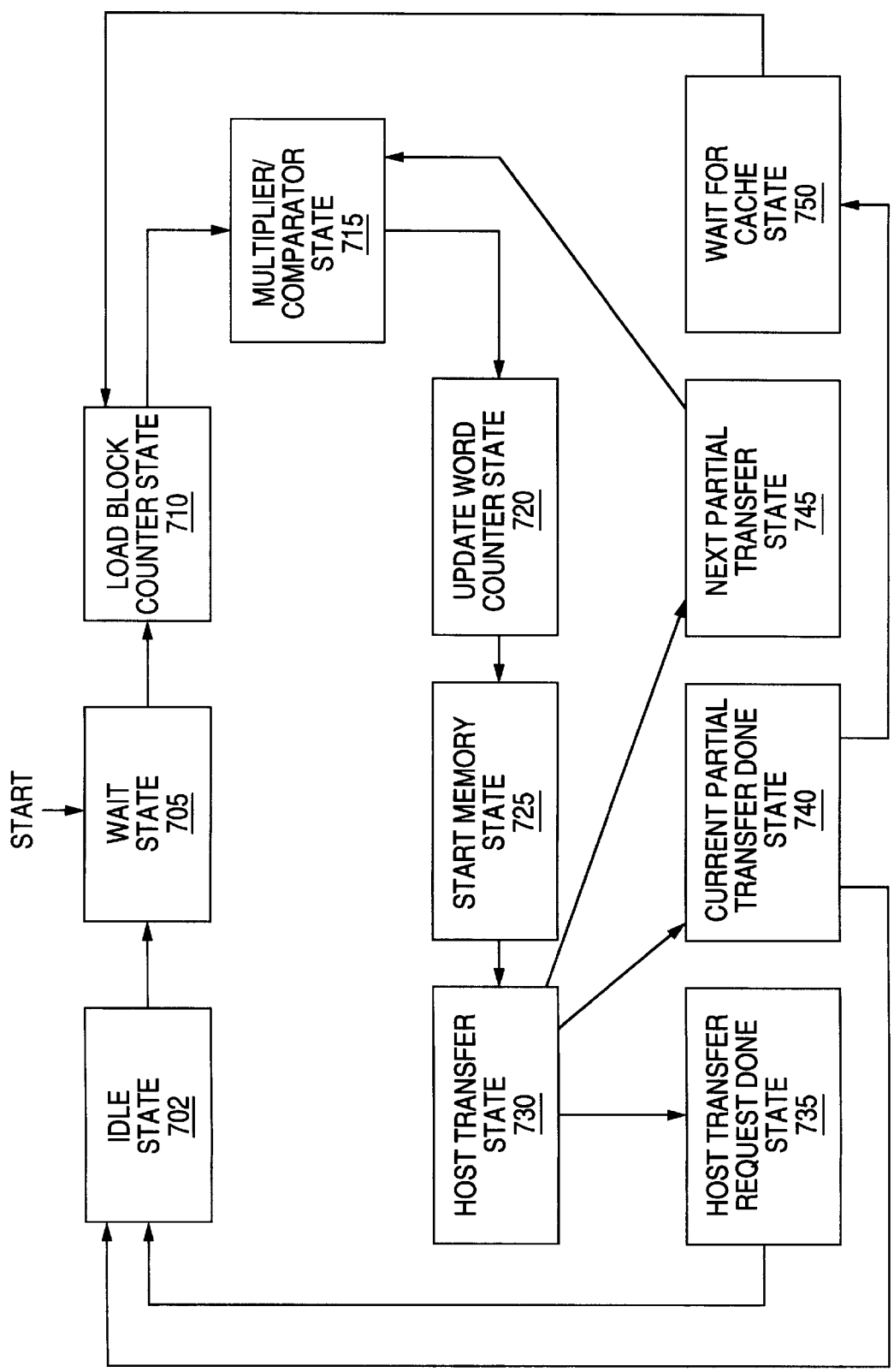
FIG. 7 shows the state diagram of a host transfer state machine a cache manager in accordance with one embodiment of the present invention.

FIG. 7 provides a state diagram for one embodiment of host transfer state machine 605. When not active, host transfer state machine 605 is in a wait state 705. Host transfer state machine 605 also returns to wait state 705 after receiving an abort or reset signal. In one embodiment, host transfer state machine 605 aborts to wait state 705 through idle state 702 only from update word counter state 720 and host transfer state 730. If the valid cache block count in valid cache block counter 615 is not equal to zero and a start signal is sent by microcontroller 170, host transfer state machine 605 transitions to a load block counter state 710, and copies the valid cache block count in valid cache block counter 615 to current block counter 620. Host transfer state machine 605 then transitions to multiplier/comparator state 715 and causes multiplier/comparator 660 to perform the comparisons and multiplication described above. In some embodiments of host transfer state machine 605, multiplier/comparator state 715 is broken up into multiple states to control different elements within multiplier/comparator 660. Next, host transfer state machine 605 transitions to update word counter state 720 and stores the result of multiplier/comparator 660 into word counter 650. Host transfer state machine 605 also copies the word count in word counter 650 to one or more host registers, e.g. the ATAPI byte count low register and the ATAPI byte count high register for ATAPI devices, to provide the partial transfer length to host computer system 190. Host transfer state machine 605 then transitions to start memory state 725 and activates memory transfer state machine 530 (FIG. 5), which is described below and illustrated in FIG. 8, to transfer data between memory buffer 150 and buffer circuit 286 (FIG. 5). For host read transfers, once both dual-port FIFO 510 and dual-port FIFO 520 are full, memory transfer state machine 530 signals host transfer state machine 605 to transition to host transfer state 730. For host write transfers, memory transfer state machine 530 signals host transfer state machine 605 to transition to host transfer state 730 when both dual-port FIFO 510 and dual-port FIFO 520 are empty. In host transfer state 730 for host read transfers, host transfer state machine 605 stores a data ready value in a host interrupt reason register 660, e.g. 02h in the ATAPI interrupt reason register for ATAPI devices, to signify that data for host computer system 190 is available. For host write transfers, host transfer state machine 605 stores a device ready value in host interrupt reason register 660, e.g. 00h in the ATAPI interrupt reason register for ATAPI devices, to signify that storage device 100 is ready to accept data from host computer system 190. Host transfer state machine 605 then sends an interrupt to host computer system 190. Upon receiving the interrupt, host computer system 190 reads the host interrupt reason register 660 and then reads the appropriate host registers to determine the length of the partial transfer. For host read transfers, data is then transferred from dual-port FIFO 510 and dual port FIFO 520 to host computer system 190 through peripheral bus 160. For host write transfers data is transferred from host computer system 190 to dual-port FIFO 510 and dual-port FIFO 520 through peripheral bus 160.

Host transfer state machine 605 remains in host transfer mode 730 until the word count in word counter 650 is equal to zero, which signifies the completion of the partial transfer. After the word count in word counter 650 is equal to zero, host transfer state machine 605 examines the total block transfer count in total block transfer counter 630 and the current block count in current block counter 620 to determine the next state. If the total block transfer count in total block transfer counter 630 is equal to zero, the host data transfer request is complete. Therefore, host transfer state machine 605 transitions to host transfer request done state 735. Host transfer state machine 605 writes a complete status in host interrupt reason register 660, e.g. 03h in the ATAPI interrupt reason register for an ATAPI device, and sends an interrupt to host computer system 190. Host transfer state machine then transitions to wait state 705 through an idle state 702.

If host transfer state machine 605 is in host transfer state 730, the current block count in current block counter 620 is equal to zero, and the total block transfer count in total block transfer counter 630 is not equal to zero then the current host data transfer request is incomplete. However, the amount of data or the number of empty blocks that was in memory buffer 150 at the beginning of the partial transfer has not been exhausted. Thus, the current partial transfer is done and host transfer state machine transitions from host transfer state 730 to a current partial transfer done state 740. If host transfer state machine is in non-automode, host transfer state machine transitions to wait state 705 through idle state 702. If host transfer state machine 605 is in automode then host transfer state machine 605 transitions from current partial transfer done state 740 to wait for cache state 750. In most embodiments of storage device 100 for host read transfers, microcontroller 170 transfers additional data into memory buffer 150 and updates valid cache block counter 615 while host transfer state machine transfers data from memory buffer 150 to host computer system 190. Similarly, for host write transfers, microcontroller 170 transfers the data from host computer system 190 in memory buffer 150 to storage media 110, thereby freeing more memory blocks in memory buffer 150. While in wait for cache state 750, host transfer state machine 605 monitors the valid cache block count in valid cache block counter 615. If the valid cache block count in valid cache block counter 615 does not equal zero, i.e. there is valid data in memory buffer 150 for host read transfers or there are empty blocks in memory buffer 150 for host write transfers, host transfer state machine 605 transitions to load block counter state 710, copies the valid cache block count in valid cache block counter 615 to current block counter 620, and continues as described above.

If host transfer state machine 605 is in host transfer state 730, the current block count in current block counter 620 is not equal to zero, and the total block transfer count in total block transfer counter 630 is not equal to zero then the product from multiplier 622 must have been greater than the maximum partial transfer length stored in MAX partial transfer register 610. Therefore, on host read transfers, more valid data blocks remain in memory buffer 150. Similarly, on host write transfers, more empty blocks are available in memory buffer 150. Thus another partial transfer between host computer system 190 and memory buffer 150 can proceed without waiting for additional data to be transferred between memory buffer 150 and storage media 110. Consequently, host transfer state machine 605 transitions to next partial transfer state 745 to initialize another partial transfer with host computer system 190. Host transfer state machine 605 then transitions to multiplier/comparator state 715 to perform the multiplication and comparisons described above. Host transfer state machine 605 then proceeds from multiplier comparator state 715 as described above.

Figure 8:
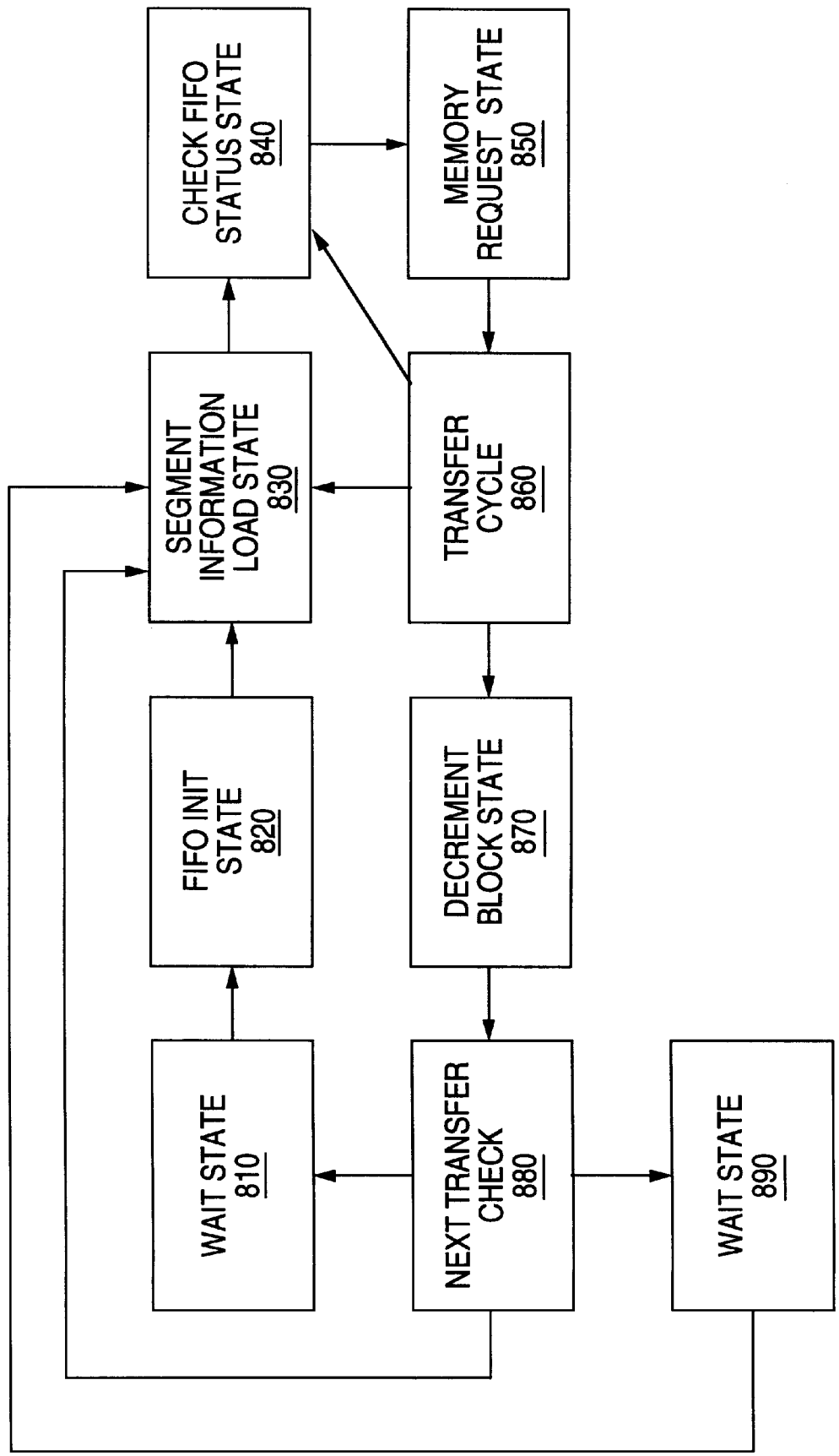
FIG. 8 shows the state diagram of a memory transfer state machine of a cache manager in accordance with one embodiment of the present invention.

FIG. 8 illustrates the state diagram of one embodiment of memory transfer state machine 530. Memory transfer state machine 530 begins in wait state 810. Memory transfer state machine 530 also returns to wait state 810 after receiving an abort or reset signal. Upon receiving an initialization signal, memory transfer state machine 530 transitions to FIFO init state 820 and initializes dual-port FIFO 510, dual-port FIFO 520, and FIFO control 540. Memory transfer state machine 530 then transitions to segment information load state 830 and controls select lines S of multiplexor 460 and multiplexor 480 to select first data length register 430 and first offset register 410 for memory requester 470.

Next, memory transfer state machine 530 transitions to check FIFO status state 840. For host read transfers, if either dual-port FIFO 510 or dual-port FIFO 520 is not full and not being accessed by peripheral bus 160, memory transfer state machine 530 transitions to memory request state 850 and commands memory requester 470 (FIG. 4) to transfer data from memory buffer 150 to the not full/not accessed dual-port FIFO. For host write transfers, if either dual-port FIFO 510 or dual-port FIFO 520 is not empty and not being accessed by peripheral bus 160, memory transfer state machine 530 transitions to memory request state 850 and commands memory requester 470 (FIG. 4) to transfer data from the not empty/not accessed dual-port FIFO to memory buffer 150. Typically, the depth of dual-port FIFO 510 and dual-port FIFO 520 is much smaller than the segment length. Therefore, multiple transfers using both dual-port FIFO 510 and dual-port FIFO 520 in a double buffering scheme is used to transfer one segment between host computer system 190 and memory buffer 150.

Memory transfer state machine 530 transitions to transfer cycle 860, after memory requester 470 performs the data transfer between memory buffer 150 and the appropriate dual-port FIFO. If the current segment is not completed memory transfer state machine transitions to check FIFO status state 840 to wait for the next available dual-port FIFO. If the current segment has been transferred but another segment within the current block remains, memory transfer state machine 530 transitions to segment information load state 830 and controls select lines S of multiplexor 440 and multiplexer 450 to select the length and offset register of the next segment. After all segments of the current block have been transferred, memory transfer state machine 530 transitions to decrement block state 870, causes host transfer block pointer 390 to increment by one, and causes total block transfer counter 630, current block counter 620, and valid cache block counter 615 (FIG. 6) to decrement by one. Some embodiments of automated cache manager 260 may increment the counters rather than decrement the counters. Furthermore, in embodiments of automated cache manager 260 not using counters for valid cache block register 272, current block register 274, and total block transfer register 276, the appropriate value of each register must be written into the registers.

Once the counters have been decremented, memory transfer state machine 530 transitions to next transfer check 880. If the total block transfer count in total block transfer counter 630 is equal to zero, then the host data transfer is complete. Therefore memory transfer state machine 530 transitions to wait state 810. Memory transfer state machine 530 also transitions from next transfer check 880 to wait state 810 if an abort signal is received or automated cache manager 260 is in non-automode and the current block count in current block counter 620 is equal to zero.

If the total block transfer count of total block transfer counter 630 is not equal to zero and the current block count in current block counter 620 is equal to zero, memory transfer state machine 530 transitions to wait state 890. Memory transfer state machine 530 remains in wait state 890 until the current block count in current block counter 630 is not equal to zero and host transfer state machine 605 sends a initialization signal. Host transfer state machine should be transitioning from host transfer state 730 to current partial transfer done state 740 (FIG. 7). When host transfer state machine 605 transitions to start memory state 725, host transfer state machine 605 sends the initialization signal to memory transfer state machine 530. If the current block count in current block counter 630 is not equal to zero, then memory transfer state machine 530 transitions to segment information load state 830 and controls multiplexor 460 and multiplexor 480 to selects first length register 430 and first offset register 410 for memory requester 470. Memory transfer state machine 530 then proceeds as described above.

If memory transfer state machine 530 is in next transfer check state 880, the total block transfer count in total block transfer counter 630 is not equal to zero, and the current block count in current block counter 620 is not equal to zero, then the current partial transfer is not complete since more valid blocks of data remain in memory buffer 150 for host read transfers or more empty blocks remain in memory buffer 150 for host write transfers. Therefore, memory transfer state machine 530 transitions to segment information load state 830 and controls select lines S of multiplexor 460 and multiplexor 480 to select first data length register 430 and first offset register 410 for memory requester 470. Memory transfer state machine 530 then proceeds as described above.

Thus, by using an automated cache manager according to the principles of this invention, a device controller in a storage device is able to transfer data to a host computer system without relying on excessive microcontroller intervention. Since the microcontroller of a storage device is a slow device, the automated cache manager prevents the microcontroller from slowing the transfer rate of the storage device. In addition, since the burden on the microcontroller is reduced, firmware code for the microcontroller is simplified. The simplified firmware require less storage space and can result in reduced cost for storage device 100.

The various embodiments of the structure and method of this invention that are described above are illustrative only of the principles of this invention and are not intended to limit the scope of the invention to the particular embodiments described. In view of this disclosure, those skilled-in-the-art can define other storage media, storage devices, state machines, counters, multipliers, registers, FIFOs, dual-port memories, caches, and use these alternative features to create a method or system of automated cache management according to the principles of this invention.

We claim:

1. A method for automating a cache transfer having a total block transfer count and a maximum partial transfer length, between a memory buffer, containing a number of valid cache blocks, of a storage device and a peripheral bus of a host computer system, said method comprising:

obtaining said number of valid cache blocks;

calculating a partial transfer length based on said number of valid cache blocks, said total block transfer length, said maximum partial transfer length, and a peripheral bus command, wherein the peripheral bus command determines a calculation of the partial transfer length;

initiating a first partial transfer having said partial transfer length between said memory buffer and said peripheral bus.

2. The method of claim 1, wherein said peripheral bus is an IDE bus.

3. The method of claim 1, wherein each of said valid cache blocks contains a copy of a storage media block.

4. The method of claim 1, further comprising:

setting a current block count equal to said number of valid cache blocks;

transferring a plurality of data words from a data block, as indicated by a current block pointer, in said memory buffer to said peripheral bus;

decrementing said current block count, said total block transfer count and said number of valid cache blocks; and incrementing said current block pointer.

5. The method of claim 4, wherein said transferring a plurality of data words from a data block comprises:

transferring a first plurality of data words from a first segment of said data block; and transferring a second plurality of data words from a second segment of said data block.

6. The method of claim 5, wherein said first segment has a first segment length, said second segment has a second segment length, and a data length, indicative of a number of desired data words in a data block, is equal to said first segment length plus said second segment length.

7. The method of claim 4, wherein said transferring a plurality of data words; said decrementing said current block count, said total block transfer count, and said number of valid cache blocks; and said incrementing said current block pointer are performed repeatedly until said partial transfer is complete.

8. The method of claim 7 repeated until said cache transfer is complete.

9. An automated cache manager to control a cache transfer having a total block transfer count and a maximum partial transfer length, between a memory buffer, containing a number of valid cache blocks, of a storage device and a peripheral bus of a host computer system, said automated cache manager comprising:

means for obtaining said number of valid cache blocks;

means for calculating a partial transfer length based on said number of valid cache blocks, said total block transfer length, said maximum partial transfer length, and a peripheral bus command, wherein the peripheral bus command determines a calculation of the partial transfer length;

means for initiating a first partial transfer having said partial transfer length between said memory buffer and said peripheral bus.

10. The method of claim 9, wherein said peripheral bus is an IDE bus.

11. The method of claim 9, wherein each of said valid cache blocks contains a copy of a storage media block.

12. The automated cache manager of claim 9, further comprising:

means for setting a current block count equal to said number of valid cache blocks;

means for transferring a plurality of data words from a data block, as indicated by a current block pointer, in said memory buffer to said peripheral bus;

means for decrementing said current block count, said total block transfer count and said number of valid cache blocks; and means for incrementing said current block pointer.

13. The automated cache manager of claim 12, wherein said means for transferring a plurality of data words from a data block comprises:

means for transferring a first plurality of data words from a first segment of said data block; and means for transferring a second plurality of data words from a second segment of said data block.

14. The automated cache manager of claim 13, wherein said first segment has a first segment length, said second segment has a second segment length, and said data length is equal to said first segment length plus said second segment length.

15. An automated cache manager to control a memory buffer, containing a number of valid cache blocks, of a storage device coupled to a peripheral bus of a host computer system, said automated cache manager comprising:

a word/block converter circuit adapted to generate a word count;

a valid cache block register configured to store said number of valid cache blocks and coupled to said word/block converter circuit;

a current block register coupled to said word/block converter circuit;

a total block transfer register coupled to said word/block converter circuit; and a data length register coupled to said word/block converter, wherein said data length register is adapted to provide a data length to said word/block converter circuit.

16. The automated cache manager of claim 15, further comprising a data length register coupled to said word/block converter; wherein said data length register is adapted to supply a data length to said word/block converter circuit.

17. The automated cache manager of claim 15, wherein said valid cache block register, said current block register, and said total block transfer register are a plurality of counters.

18. The automated cache manager of claim 15, wherein each of said valid cache blocks contains a copy of a storage media block.

19. The automated cache manager of claim 15, wherein said peripheral bus is an IDE bus.

20. The automated cache manager of claim 15, further comprising a buffer circuit coupled between said memory buffer and said peripheral bus.

21. The automated cache manager of claim 20, wherein said buffer circuit comprises:

a first dual-port FIFO coupled between said memory buffer and said peripheral bus; and a second dual-port FIFO coupled between said memory buffer and said peripheral bus.

22. A method for automating a cache transfer having a total block transfer count and a maximum partial transfer length, between a memory buffer, containing a number of valid cache blocks, of a storage device and a peripheral bus of a host computer system, said method comprising:

obtaining said number of valid cache blocks;

calculating a partial transfer length based on said number of valid cache blocks, said total block transfer length, and said maximum partial transfer length, comprising:

comparing said number of valid cache blocks with said total block transfer length to determine a first lower value;

multiplying said first lower value with a data length, indicative of a number of desired data words in a data block, to generate a product;

comparing said product with said maximum partial transfer length to determine a second lower value; and setting said partial transfer length equal to said second lower value; and initiating a first partial transfer having said partial transfer length between said memory buffer and said peripheral bus.

23. The method of claim 22, wherein said peripheral bus is an IDE bus.

24. The method of clam 22, wherein each of said valid cache blocks contains a copy of a storage media block.

25. The method of claim 22, further comprising:

setting a current block count equal to said number of valid cache blocks;

transferring a plurality of data words from a data block, as indicated by a current block pointer, in said memory buffer to said peripheral bus;

decrementing said current block count, said total block transfer count and said number of valid cache blocks; and incrementing said current block pointer.

26. The method of claim 25, wherein said transferring a plurality of data words from a data block comprises:

transferring a first plurality of data words from a first segment of said data block; and transferring a second plurality of data words from a second segment of said data block.

27. The method of claim 25, wherein said first segment has a first segment length, said second segment has a second segment length, and a data length, indicative of a number of desired data words in a data block, is equal to said first segment length plus said second segment length.

28. The method of claim 25, wherein said transferring a plurality of data words; said decrementing said current block count, said total block transfer count, and said number of valid cache blocks; and said incrementing said current block pointer are performed repeatedly until said partial transfer is complete.

29. The method of claim 28 repeated until said cache transfer is complete.

30. A method for automating a cache transfer having a total block transfer count and a maximum partial transfer length, between a memory buffer, containing a number of valid cache blocks, of a storage device and a peripheral bus of a host computer system, said method comprising:

obtaining said number of valid cache blocks;

calculating a partial transfer length based on said number of valid cache blocks., said total block transfer length, and said maximum partial transfer length;

initiating a first partial transfer having said partial transfer length between said memory buffer and said peripheral bus, comprising:

copying said partial transfer length to a host register for said host computer system;

storing a data ready value in a host interrupt reason register; and generating an interrupt to said host computer system.

31. The method of claim 30, wherein said peripheral bus is an IDE bus.

32. The method of claim 30, wherein each of said valid cache blocks contains a copy of a storage media block.

33. The method of claim 30, further comprising:

setting a current block count equal to said number of valid cache blocks;

transferring a plurality of data words from a data block, as indicated by a current block pointer, in said memory buffer to said peripheral bus;

decrementing said current block count, said total block transfer count and said number of valid cache blocks; and incrementing said current block pointer.

34. The method of claim 33, wherein said transferring a plurality of data words from a data block comprises:

transferring a first plurality of data words from a first segment of said data block; and transferring a second plurality of data words from a second segment of said data block.

35. The method of claim 33, wherein said first segment has a first segment length, said second segment has a second segment length, and a data length, indicative of a number of desired data words in a data block, is equal to said first segment length plus said second segment length.

36. The method of claim 33, wherein said transferring a plurality of data words; said decrementing said current block count, said total block transfer count, and said number of valid cache blocks; and said incrementing said current block pointer are performed repeatedly until said partial transfer is complete.

37. The method of claim 36 repeated until said cache transfer is complete.

38. An automated cache manager to control a cache transfer having a total block transfer count and a maximum partial transfer length, between a memory buffer, containing a number of valid cache blocks, of a storage device and a peripheral bus of a host computer system, said automated cache manager comprising:

means for obtaining said number of valid cache blocks;

means for calculating a partial transfer length based on said number of valid cache blocks, said total block transfer length, and said maximum partial transfer length, comprising:

means for comparing said number of valid cache blocks with said total block transfer length to determine a first lower value;

means for multiplying said first lower value with a data length, indicative of a number of desired data words in a data block, to generate a product;

means for comparing said product with said maximum partial transfer length to determine a second lower value; and means for setting said partial transfer length equal to said second lower value; and means for initiating a first partial transfer having said partial transfer length between said memory buffer and said peripheral bus.

39. The method of claim 30, wherein said peripheral bus is an IDE bus.

40. The method of claim 38, wherein each of said valid cache blocks contains a copy of a storage media block.

41. The automated cache manager of claim 38, further comprising:

means for setting a current block count equal to said number of valid cache blocks;

means for transferring a plurality of data words from a data block, as indicated by a current block pointer, in said memory buffer to said peripheral bus;

means for decrementing said current block count, said total block transfer count and said number of valid cache blocks; and means for incrementing said current block pointer.

42. The automated cache manager of claim 41, wherein said means for transferring a plurality of data words from a data block comprises:

means for transferring a first plurality of data words from a first segment of said data block; and means for transferring a second plurality of data words from a second segment of said data block.

43. The automated cache manager of claim 42, wherein said first segment has a first segment length, said second segment has a second segment length, and said data length is equal to said first segment length plus said second segment length.

44. An automated cache manager to control a cache transfer having a total block transfer count and a maximum partial transfer length, between a memory buffer, containing a number of valid cache blocks, of a storage device and a peripheral bus of a host computer system, said automated cache manager comprising:

means for obtaining said number of valid cache blocks;

means for calculating a partial transfer length based on said number of valid cache blocks, said total block transfer length, and said maximum partial transfer length; and means for initiating a first partial transfer having said partial transfer length between said memory buffer and said peripheral bus, comprising:

means for copying said partial transfer length to a host register for said host computer system;

means for storing a data ready value in a host interrupt reason register; and means for generating an interrupt to said host computer system.

45. The method of claim 44, wherein said peripheral bus is an IDE bus.

46. The method of claim 44, wherein each of said valid cache blocks contains a copy of a storage media block.

47. The automated cache manager of claim 44, further comprising:

means for setting a current block count equal to said number of valid cache blocks;

means for transferring a plurality of data words from a data block, as indicated by a current block pointer, in said memory buffer to said peripheral bus;

means for decrementing said current block count, said total block transfer count and said number of valid cache blocks; and means for incrementing said current block pointer.

48. The automated cache manager of claim 47, wherein said means for transferring a plurality of data words from a data block comprises:

means for transferring a first plurality of data words from a first segment of said data block; and means for transferring a second plurality of data words from a second segment of said data block.

49. The automated cache manager of claim 48, wherein said first segment has a first segment length, said second segment has a second segment length, and said data length is equal to said first segment length plus said second segment length.

50. An automated cache manager to control a memory buffer, containing a number of valid cache blocks, of a storage device coupled to a peripheral bus of a host computer system, said automated cache manager comprising:

a word/block converter circuit adapted to generate a word count;

a valid cache block register configured to store said number of valid cache blocks and coupled to said word/block converter circuit;

a current block register coupled to said word/block converter circuit;

a total block transfer register coupled to said word/block converter circuit;

a first data length register adapted to contain a first segment length;

a second data length register adapted to contain a second segment length; and an adder coupled to said first data length register, said second data length register, and said word/block converter, wherein said adder is adapted to provide a data length to said word/block converter circuit by adding said first segment length and said second segment length.

51. The automated cache manager of claim 50, wherein said valid cache block register, said current block register, and said total block transfer register are a plurality of counters.

52. The automated cache manager of claim 50, wherein each of said valid cache blocks contains a copy of a storage media block.

53. The automated cache manager of claim 50, wherein said peripheral bus is an IDE bus.

54. The automated cache manager of claim 50, wherein said word/block converter circuit comprises:

a first comparator coupled to said current block register and said total block register; and a multiplier coupled to said first comparator circuit and said adder.

55. The automated cache manager of claim 54, further comprising a max partial transfer register and wherein said word/block converter circuit further comprises a second comparator coupled to said max partial transfer register and said multiplier.

56. The automated cache manager of claim 50, further comprising a buffer circuit coupled between said memory buffer and said peripheral bus.

57. The automated cache manager of claim 56, wherein said buffer circuit comprises:

a first dual-port FIFO coupled between said memory buffer and said peripheral bus; and a second dual-port FIFO coupled between said memory buffer and said peripheral bus.

* * * * *